May 28, 1968
A. M. ROHN
3,385,746
APPARATUS FOR SEALING THE ENDS OF A STRIP
OF PLEATED FIBROUS MATERIAL
Filed Dec. 26, 1963
2 Sheets-Sheet 1
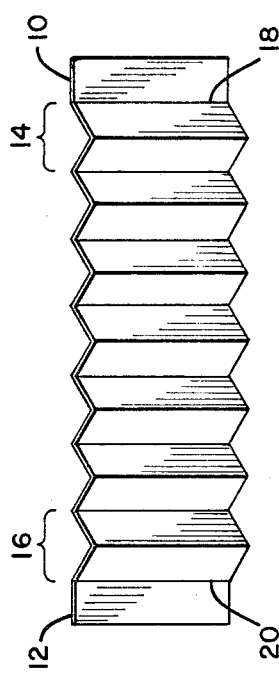
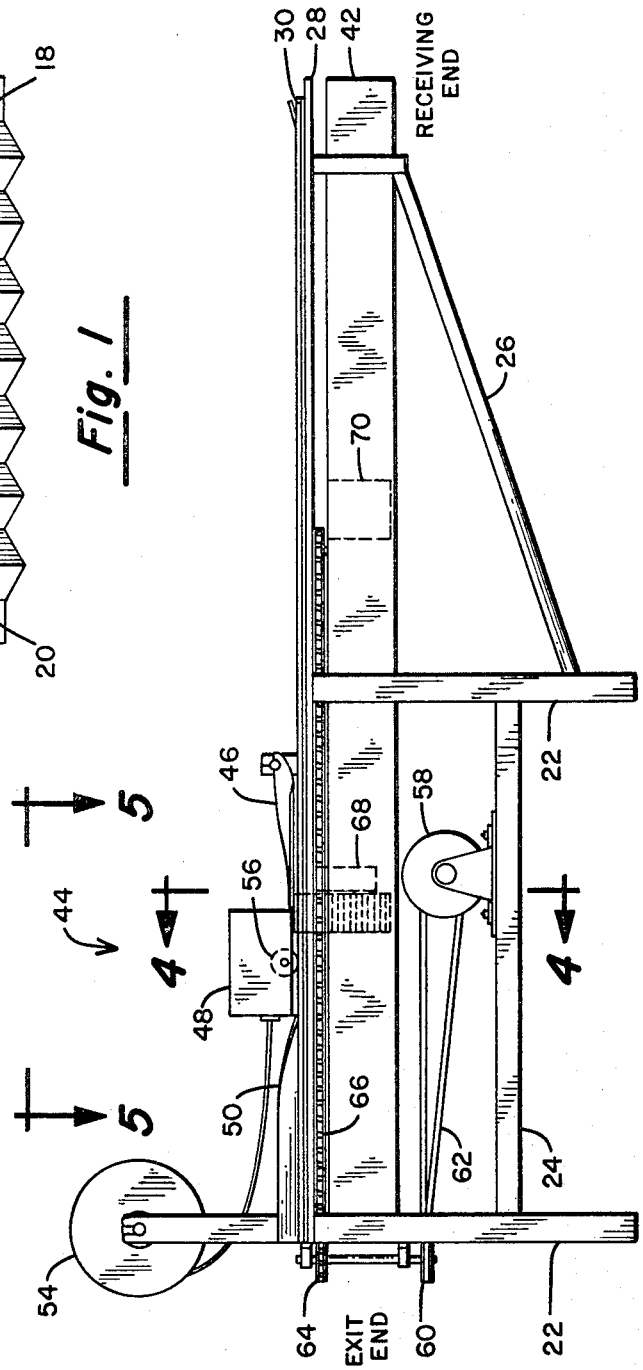
INVENTOR
ABBOTT M. ROHN
BY *Marvin Jacobson*
ATTORNEY

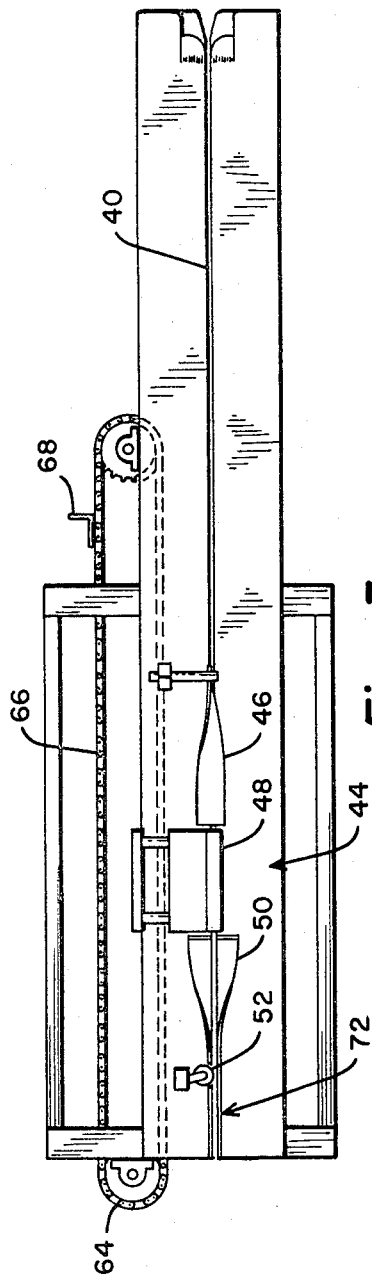
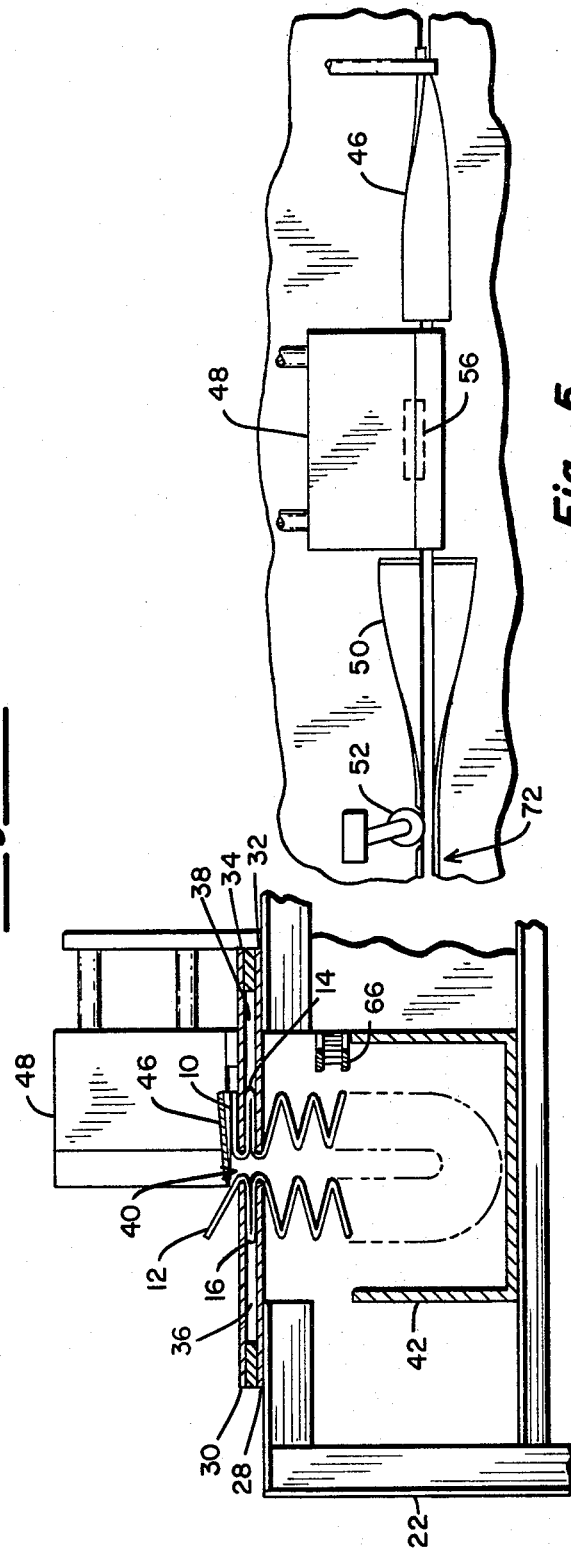

United States Patent Office 3,385,746
Patented May 28, 1968

3,385,746
APPARATUS FOR SEALING THE ENDS OF A STRIP OF PLEATED FIBROUS MATERIAL
Abbott M. Rohn, Minneapolis, Minn., assignor to Gould-National Batteries, Inc., a corporation of Delaware
Filed Dec. 26, 1963, Ser. No. 333,427
12 Claims. (Cl. 156—443)

ABSTRACT OF THE DISCLOSURE

A machine for attaching together the ends of a strip of pleated fibrous filter material having a pair of raceways which form tracks for holding end pleats of the material while the rest of the material hangs down in a loop along with an arm for pushing against the loop of the material to slide it down the tracks and with a mechanism for applying adhesive to the exposed end flaps and pressing the adhesive coated flaps to seal them together.

---

This invention relates generally to automatic material handling and processing machines. More particularly the invention is related to machines for the automatic handling and processing of strips of pleated fibrous material commonly used as filter media and especially for automatically bonding together the side-ends of the strips.

Filter elements for filtering various fluids such as gas, oil or air often contain filter media which is constructed from strips of fibrous material which are pleated as illustrated in FIG. 1. Generally the strip is formed into a cylindrical configuration by attaching the end marginal lengths or side-ends, such as 10 and 12 respectively, to one another and then it is inserted into a suitable cylindrical container. In the past the end marginal lengths have been attached to one another either by suitable mechanical clip devices or by adhesive bonding. The former is not too satisfactory since any overhanging extensions of the clips prevents the filter assembly from properly seating in the end caps of the container and further results in an inadequate bond allowing some of the fluid to leak out without passing through the filter media. The use of adhesive has been more satisfactory. However, because the pleated material has been difficult to handle mechanically, sealing the two side end pieces with adhesive has been done manually. This manual operation is costly, results in non-uniformity of the seal and is messy. Thus it is preferable to process the material by automatic machinery.

It is a general object of this invention to provide an automatic machine for handling and processing strips of pleated fibrous material.

It is a further object of this invention to provide, in an automatic machine, means for conveying strips of pleated fibrous material to and from automatic processing stations.

Another object of this invention is to provide a machine for sealing together the end margins of a strip of pleated fibrous material.

Still another object of this invention is to provide a machine for effecting a fluid-tight seal between the ends of a strip of pleated fibrous material for use as a fillter media along with means for conveying said material to and from the sealing apparatus.

The preferred embodiment of this invention, which will be subsequently described in greater detail as utilized in producing filter elements, includes: a pair of elongated, horizontal, spaced-apart raceways for slidably engaging the endmost full pleats of a strip of pleated fibrous material in a manner such that the end margins extend above the raceways while the remaining pleated length extends downwardly from the raceways while supported by the engaged pleats; means for sliding the strip, while so engaged, along the raceway; guiding means for suitably positioning the end margins as the strip is moved along the raceways; and means for pressing together the end margins after adhesive has been applied and while the adhesive is setting up. Since the strip of material is continuously moving during the process, it can be seen that little or no time is wasted in this automatic process so that the machine is readily adaptable to a continuous assembly line operation. Furthermore, since in the preferred embodiment of this invention the main portion of the filter media is never firmly grasped by mechanical fingers, there is little or no danger of the fibrous material being fractured during this automatic process.

These and other objects and features will become apparent in the course of the following detailed description, in which:

FIG. 1 is an illustration of a strip of pleated material which is processed by the machine embodiment of this invention;

FIG. 2 is a front view of the preferred embodiment of the invention;

FIG. 3 is a top view of a portion of the FIG. 2 embodiment;

FIG. 4 is an enlarged view taken along section line 4—4 of FIG. 2; and

FIG. 5 is an enlarged top view of a portion of FIG. 2 as viewed along line 5—5.

Referring to the illustrated strip of pleated fibrous material as shown in FIG. 1, a few of the terms used in the following specification and the claims will now be defined. A pleat or full pleat is defined as comprising two folds and three fold lines. For example, the rightmost pleat in FIG. 1 is bracketed at 14 and the leftmost pleat is bracketed at 16. These are sometimes referred to as the endmost full pleats. The rightmost side or end margin length of the pleated strip of material is the single fold 10 and the leftmost side or end margin length is 12. Full pleat 14 makes a fold line 18 with end margin 10 and full pleat 16 makes a fold line 20 with end margin 12.

The remaining figures illustrate, from various views, the preferred embodiment of this invention as utilized for handling and processing the strip of material illustrated in FIG. 1. Where identical parts are shown in the various figures they are identified by the same item number.

The main support structure for the machine includes the vertical leg members 22, cross members 24 and diagonal support member 26, all welded, bolted or otherwise fixedly attached to one another. Elongated, substantially flat plate members 28 and 30 are horizontally disposed along and fixedly attached to the front facing upper part of the main support structure and, as most clearly illustrated in FIG. 4, a second pair of similar plate members 32 and 34 are similarly disposed at the rear of the support. The plate members in each set are vertically displaced from one another forming channels or raceways 36 and 38 respectively therebetween. The two raceways are laterally displaced from one another to define an elongated elevated track 40 (FIG. 3) which extends from the rightmost or receiving end to the leftmost or exit end. The respectively corresponding upper plate members 30 and 34 and lower plate members 28 and 32 are coplanar so that the corresponding raceways are likewise in a common plane. Extending along and underneath the track is a trough 42 of general U-shaped cross section which is bolted, welded or otherwise attached to the main support structure.

Disposed above the channel-forming flat plate members between the two ends of the track is a sealing station, generally designated 44, for sealing the two end margin lengths of the strip of pleated material together as they are transported therepast. From right to left or from the receiving end toward the exit end along a portion of the track the sealing station 44 comprises, in sequence, a fold-down guide 46, an adhesive applicator 48 and a fold-up guide 50. There may be further included compression wheel 52 for insuring that sufficient pressure is applied to the end margins as they seal together and pressure plates, such as at 72, for holding the ends together while the adhesive sets up. The latter may be vertically oriented extensions of the fold-up guide plates 50. The fold-down guide 46 is preferably an elongated sheet or fairly rigid material such as formed metal or plastic and is attached to the upper plate member 34 by any suitable means. The fold-down guide is contoured either by preforming or by twisting a flat sheet of material so that it is substantially vertically oriented at its end toward the receiving end of the track and is substantially horizontally oriented at the end closest to the adhesive applicator 48. This configuration of the fold-down guide 46 bends the end margin length of the strip of pleated material which normally protrudes in a general vertical direction upwardly above the flat plate member 34, as best illustrated in FIG. 4, back onto said plate member in a substantially horizontal position to expose a major surface of the end margin of the adhesive applicator 48. Adhesive, in solid rope form, is fed from reel 54 into the adhesive applicator 48 where it is melted into liquid form by means not shown. A bead of this hot melt adhesive is coated onto at least a portion of the major surface of at least one of the end margins of the strip continuously and uniformly thereover as it travels past, preferably by an adhesive transfer wheel indicated at 56 in FIG. 5.

The fold-up guide 50 extends from the adhesive applicator 48 along the track toward the exit end thereof. It comprises a pair of guides which are similar in construction to the single fold-down guide 46 and which are respectively attached to the top plate members 30 and 34 of the respective raceways 36 and 38. The fold-up guides are twisted or otherwise contoured from a substantially horizontal orientation at their ends closest to the adhesive applicator 48 to a substantially vertical orientation at a distance removed from the adhesive applicator toward the exit end of the track. These serve to guide the two end margins of the strip from a relatively horizontal position after the adhesive has been applied into pressing juxtaposition with the adhesive therebetween to seal the two end margins to one another. There may be further included a pressure applying wheel 52 oriented substantially horizontally for further insuring that adequate pressure is applied to the two end margins while the adhesive is solidifying. Preferably, the vertically oriented plates 72 of the fold-up guide are continuous past the pressure wheel 52 to the exit end to hold the ends together while the adhesive sets up. These plates can be spring-loaded, by means not shown, to insure adequate pressure being applied to the end lengths while being sealed together. The enlarged top view of the sealing station 44, as shown in FIG. 5, illustrates more clearly the shape, sizes and relative placement of the portions of the sealing station.

Referring back to FIG. 2 there is shown a main driving motor 58 which is suitably mounted in the main support frame and drives horizontally disposed pulley 60 through endless belt 62 with the pulley suitably journaled in the main support frame. Mounted coaxially with the pulley 60 and driven thereby is chain sprocket 64 which drives endless chain 66 which extends substantially parallel to and along the length of the track 40. Fixedly attached to the chain 66 is a paddle arm 68 which extends outwardly therefrom and which travels along and under the track from the receiving end toward the exit end in trough 42 but is disposed outside the trough and removed from the track when traveling rearwardly from the exit end back toward the receiving end. A rectangular cutout opening in the trough, indicated at 70, allows the paddle to move into the trough to travel in a forward direction along the track.

The operation of the machine will now be described as used in a typical application for sealing the end margins of a length of pleated fibrous material, such as illustrated in FIG. 1, for use as filter media. At the receiving end the endmost full pleats, such as 14 and 16, are inserted either manually or by mechanical means not illustrated, into the respective raceways 38 and 36 with both folds of each pleat extending substantially completely into the respective raceways. When initially engaged in the raceways in this manner, the end margin lengths of the pleated material, 10 and 12 respectively, extend upwardly above the respective plate members 34 and 30 of the raceways and the remaining length of the pleated material extends downwardly in a loop from the respective bottom members of the raceways 32 and 28. Although for the most part the weight of the downwardly extended length of pleated material is supported by the engagement of the pleats 14 and 16 in the channels of the raceways, the bottom of trough 42 may provide additional support in order to insure that the pleated fibrous material does not deform due to excessive stretching. With energy applied to the driving motor 58, the endless chain 66 with attached paddle arm 68 begins its described travel. When the paddle arm passes into the trough 42 through the opening 70 and down track 40 toward the exit it pushes against the downwardly extending length of the strip of pleated material causing the strip to slide down the track toward the exit end. As the upward extending end margin length 10 engages with the fold-down guide 46 it is bent to shape in conformance with the contour of the folddown guide as the material is being moved therepast by the paddle arm. At the end of the fold-down guide closest to the adhesive applicator 48, end margin 10 is substantially horizontal and is lying on the top surface of the flat top plate member 34. Adhesive in liquid form is applied to the upward facing surface of end margin 10 by the adhesive transfer roller 56 as the material is moving therepast. It has generally been found that adhesive need only be applied to one of the end margins, although obviously the machine could be expanded by the addition of another applicator to apply adhesive to the facing surfaces of both end margins in the manner described. As the material is moved past the adhesive applicator 48 toward the exit end, the end margins 10 and 12 come into contact with the fold-up guides 50 and are bent into a substantial vertical orientation in conformance with the contour of said fold-up guides. Preferably the vertically oriented portions of the fold-up guides 50 are spaced close together so as to bring the end margins into juxtaposition with the adhesive therebetween with sufficient pressure applied to seal the end margins together as the material is being moved along the track and as the adhesive sets up. To further ensure a uniform, tight seal between the end margins, pressure wheel 52 may be included and the vertically oriented pressure plates 72 may be spring-loaded. By the time the pleated material reaches the exit end of the track the adhesive is set up sufficiently so that the filter element may be transported for further processing or removed and inserted into a container.

Although not shown, it is contemplated that appropriate linkages between the drive motor 58 and the adhesive applicator can be included to feed the proper amount of solid adhesive into the adhesive applicator at the proper rate so that a supply of liquid adhesive is available as needed. Additionally, means can also be included to control the temperature of the adhesive while in the liquid state. It is further contemplated that the rate of feed of the filter elements into the receiving end will be synchronized with the speed of the endless chain 66 and the number of paddle arms so that the pleated material is in proper position when the paddle arm enters the trough and comes into contact with the strip.

The sealing or bonding operation accomplished by this invention is of particular interest. Adhesive of the solid rope form, as described, is readily adaptable into an automatic machine operation. The adhesive is supplied at the rate at which it is consumed by controlling the rate of feed to the applicator. The solid adhesive is melted by controlled elevated temperature and after application it sets up at reduced temperature. To speed up the rate at which the adhesive sets, the pressure plates 72 can be water-cooled. Additionally, since the adhesive is applied in its molten state, an extrusion nozzle can be used in place of the adhesive transfer wheel 56. Either of these or other means for automatically applying the adhesive to the strip of material can be incorporated into this invention to effect the application of a uniform coating of adhesive of the required size without undue messy drippage of the adhesive and with all of the attendant features and advantages.

Preferably, a high molecular weight polyester adhesive is used. This will set up with negligible shrinkage so that no leaks in the sealed filter element will be present. Additionally, even though it is applied to the filter element in the molten state, it does not run or wick into the filter media.

I claim:

1. A machine for sealing side-ends of pleated filter elements, comprising in combination: a pair of longitudinally extending, generally horizontal, spaced-apart raceways forming a track for engaging a full pleat at the respective ends of a strip of accordion-pleated fibrous material with one fold of each full pleat resting on the lower part of the respective raceways for supporting the weight of the strip and an end margin length of said strip extending above the upper part of the respective raceways and the remaining pleated length extending downwardly in a loop from the respective raceways; means for transporting the strip of material along said track while so engaged in said track; and means disposed at least partly along said track for sealing said end margin lengths to one another while said strip is being transported therepast.

2. A machine for sealing side-ends of pleated filter elements, comprising in combination: a main support member; means attached to said main support member for forming a pair of spaced-apart, elongated, horizontal raceways defining an elevated track for slidably engaging a pleat at the respective ends of a strip of accordion-pleated fibrous material with one fold of each full pleat resting on the lower part of the respective raceways for supporting the weight of the strip and an end margin length of the strip extending above the upper part of the respective raceways and the remaining length of pleated material extending in a loop downwardly from said raceways while supported by the engaged pleats; a movable arm extending underneath said track into contact with the loop of pleated material for pushing the strip slidingly along the track while engaged in the track; driving means mounted to said main support member for moving said arm; means for attaching one end of said arm to said driving means; and means mounted on said main support member above and at least partly along said track for sealing together said end margin lengths as said strip is moved therepast.

3. A machine as described in claim 2 wherein said sealing means comprises: means for applying a uniform coating of adhesive in liquid state to at least a portion of a major surface of at least one of the end margin lengths; and means for pressing together the two end margin lengths with the adhesive therebetween while said adhesive is solidifying.

4. A machine as described in claim 3 wherein said means for forming each of the raceways comprises: a pair of elongated, substantially flat, horizontally disposed plate members vertically displaced from one another to form a pleat-receiving channel.

5. The machine as described in claim 4 wherein the plate members form a channel for receiving both folds of the pleat substantially completely within the channel and a height so that one fold is supported on the lower plate member while the other fold is at least in part in contact with the upper plate member.

6. The machine as described in claim 5 wherein said channel retains the respective folds in contact with a corresponding plate member in the area of a fold line other than their common fold line.

7. The machine as described in claim 6 wherein said channel maintains said other fold in contact with the upper plate member in the area along the fold line that said other fold makes with the corresponding end margin length.

8. The machine as described in claim 7 wherein said channel holds said end margin length substantially completely above the upper plate member from the fold line it makes with said other fold.

9. The machine as described in claim 8 further including folding means attached to at least one of said upper plate members located along said track before said sealing means for folding at least one of the upward extending end margin lengths substantially horizontally back on its corresponding upper plate member before adhesive is applied thereto.

10. A machine for sealing side-ends of pleated filter elements, comprising in combination: main support structure; a pair of elongated raceways each comprising first and second elongated substantially flat, horizontally disposed, plate members attached to said support structure, said plate members vertically displaced from one another to form a channel therebetween; said raceways transversely spaced apart with the corresponding plate members coplanar to define an elevated elongated track having a receiving end and a terminal end; said raceways respectively adapted to slidably engage an end pleat of a strip of pleated fibrous material with both folds of the engaged pleat extending substantially completely into the channel, one fold being in weight-supporting contact with the lower plate member and the other fold being in contact with the upper plate member in the area along a fold line it makes with an end margin length of the material which extends upwardly above the upper plate member from said fold line, and the remaining pleated length of material extending downwardly from said lower plate member; a movable arm extending underneath said track into contact with the downwardly extending pleated material for pushing the strip slidingly along the track toward the terminal end while said strip is engaged with the raceways in said manner; driving means mounted to said main support structure for moving said arm; means for attaching one end of said arm to said driving means; folding means attached to at least one of said raceway plate members between the receiving and terminal ends of the track for folding at least one of the end margin lengths substantially horizontally back on the corresponding upper plate member while the strip is being moved therepast; means attached to said main support structure adjacent said folding means toward the terminal end of the track for applying a uniform coating of liquefied adhesive to at least a portion of the exposed surface of the folded-back end margin length as the strip is being moved therepast; and means attached to said main support structure adjacent said latter means toward the terminal end of the track for pressing the adhesive coated surface of an end margin length against a coextensive surface of the other end margin length while the adhesive is solidifying as the strip is being moved therepast.

11. The machine as described in claim 10 wherein said folding means comprises an elongated sheet of rigid material twisted from a substantially horizontal orientation at its end closest to said adhesive applying means to a substantially vertical orientation at its end furthest from said adhesive applying means.

12. The machine as described in claim 11 wherein said pressing means includes guide means comprising a pair of elongated sheets of rigid material paralleling the track with a gap substantially equal to the track width therebetween, each twisted from a substantially horizontal orientation at the ends closest to said adhesive applying means to a substantially vertical orientation further removed from said adhesive applying means.

References Cited

UNITED STATES PATENTS

| 2,764,919 | 10/1956 | Molla | 93—77 |
| 3,035,498 | 5/1962 | Molla | 156—466 X |

EARL M. BERGERT, *Primary Examiner.*

PHILIP DIER, *Examiner.*